(12) United States Patent
Mobin et al.

(10) Patent No.: US 6,249,554 B1
(45) Date of Patent: Jun. 19, 2001

(54) POWER BASED DIGITAL AUTOMATIC GAIN CONTROL CIRCUIT

(75) Inventors: Mohammad Shafiul Mobin, Whitehall; Akkas T. Sufi, Laurys Station, both of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/019,402

(22) Filed: Feb. 5, 1998

Related U.S. Application Data
(60) Provisional application No. 60/055,696, filed on Jul. 15, 1997.

(51) Int. Cl.[7] ............................................. H04L 27/08
(52) U.S. Cl. ........................... 375/345; 375/316; 375/344
(58) Field of Search ..................................... 375/344, 230, 375/231, 234, 316, 261, 326, 345; 342/92; 329/304; 455/219, 232.1, 234.1, 226.1, 136, 204, 245.1

(56) References Cited

U.S. PATENT DOCUMENTS

| | | | |
|---|---|---|---|
| 5,471,508 | * 11/1995 | Koslov | 375/344 |
| 5,495,203 | * 2/1996 | Harp et al. | 329/306 |
| 5,661,761 | * 8/1997 | Iwamatsu | 375/344 |
| 5,673,293 | * 9/1997 | Scarpa et al. | 375/321 |
| 5,867,539 | * 2/1999 | Koslov | 375/346 |
| 5,870,442 | * 2/1999 | Farrow | 375/355 |
| 5,949,796 | * 9/1999 | Kumar | 370/529 |
| 5,956,373 | * 9/1999 | Goldston et al. | 375/298 |
| 5,978,415 | * 11/1999 | Kobayashi et al. | 375/230 |

* cited by examiner

*Primary Examiner*—Chi Pham
*Assistant Examiner*—Emmanuel Bayard
(74) *Attorney, Agent, or Firm*—John P. Veschi

(57) ABSTRACT

In a receiver, a digital automatic gain control circuit receives a series of digital samples representing at least one of an in-phase component and a quadrature component of a received signal, and provides scaled in-phase components and scaled quadrature components to an equalizer. The digital automatic gain control circuit includes a gain updating unit that receives a value representing at least one of an in-phase component and a quadrature component, receives a target reference value, and updates a gain value based on a difference therebetween. The digital automatic gain control circuit also includes a scalar that scales the received signal based on the updated gain value.

17 Claims, 2 Drawing Sheets

POWER BASED DIGITAL AUTOMATIC GAIN CONTROL CIRCUIT

Priority of U.S. Provisional Application Ser. No: 60/055,696, filed Jul. 15, 1997, is hereby claimed.

This application is related to application Ser. No. 09/114,949, entitled "Fixed Clock Based Arbitrary Symbol Rate Timing Recovery Loop" (Marandi 2-30-4-1), application Ser. No. 09/019,320, entitled "Amplitude Based Coarse Automated Gain Control Circuit" (Marandi 1-31-5-3), application Ser. No. 09/114,948, entitled "Variable Baudrate Demodulator" (Farrow 31-29-3-7-2), and application Ser. No. 08/993465, entitled "Equalization Circuit for Unknown QAM Constellation Size" (Farrokh 1-1-9-2), each co-filed herewith and incorporated herein by reference.

BACKGROUND OF THE INVENTION

The demodulation scheme described in application Ser. No. 09/114,948 (Farrow 31-29-3-7-2) provides for the receipt of quadrature amplitude modulated (QAM) analog signals. These analog signals are converted to digital representations by an analog-to-digital converter and demodulated to yield digital representations of in-phase and quadrature components of the analog QAM signal application Ser. No. 09/114,948 (Farrow 31-29-3-7-2) also describes the interpolation of the digital representations to create a sample stream having a frequency related to a desired baud rate. After decimation and filtering, these samples are provided, at the desired baud rate, to an equalizer. The samples provided to the equalizer are in the form of multibit samples, such as, for example, 10-bit samples.

It is preferable that the 10-bit samples provided to the equalizer cover most of the dynamic range of the equalizer. If some of the samples have a value outside the dynamic range of the equalizer, saturation will occur, resulting in a loss of information. Conversely, if the samples consistently have values less than the dynamic range of the equalizer, then the resolution is not optimized.

SUMMARY OF THE INVENTION

In a receiver, a digital automatic gain control circuit receives a series of digital samples representing at least one of an in-phase component and a quadrature component of a received signal, and provides scaled in-phase components and scaled quadrature components to an equalizer. The digital automatic gain control circuit includes a gain updating unit that receives a value representing at least one of an in-phase component and a quadrature component, receives a target reference value, and updates a gain value based on a difference therebetween. The digital automatic gain control circuit also includes a scalar that scales the received signal based on the updated gain value.

A method of controlling a gain of a stream of quadrature amplitude modulated digital values includes the steps of determining an average input power over a series of the digital values, comparing the average input power to a reference power to create a difference value, updating a gain value based on the difference value, and using the updated gain value to scale the stream of digital values.

DETAILED DESCRIPTION

Figure 1:
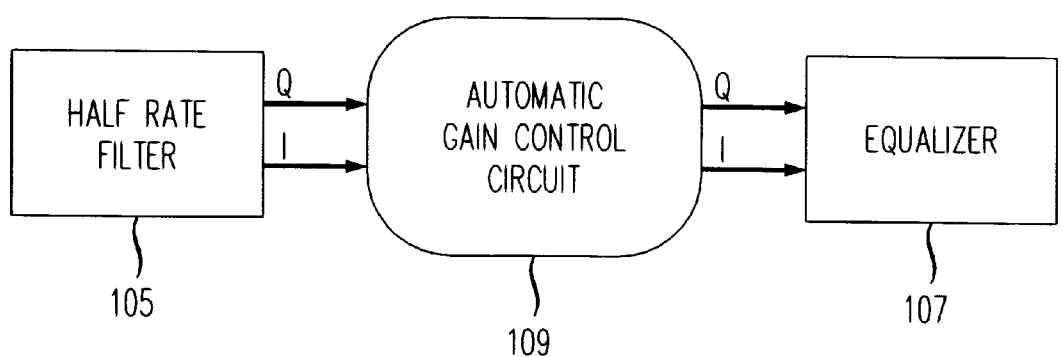
FIG. 1 is a simplified block diagram of a system incorporating an exemplary embodiment of a digital automatic gain control circuit according to the invention.

The circuit of FIG. 1 includes half rate filter 105 and equalizer 107 as part of an exemplary modem or digital data receiver, such as an integrated circuit based receiver. As described, for example, in co-pending application Ser. No. 09/114,948 (Farrow 31-29-3-7-2), half rate filter 105 outputs multibit in-phase and quadrature components, such as, for example 16-bit components at a target baud rate to equalizer 107. According to one exemplary embodiment of the invention, automatic gain control circuit 109 is coupled between half rate filter 105 and equalizer 107 to operate on the in-phase and quadrature components output by half rate filter 105 prior to their receipt by equalizer 107. For example, automatic gain control circuit 109 outputs 10-bit scaled in-phase and quadrature components to equalizer 107 as adjusted versions of the 16-bit components received from half rate filter 105.

Figure 2:
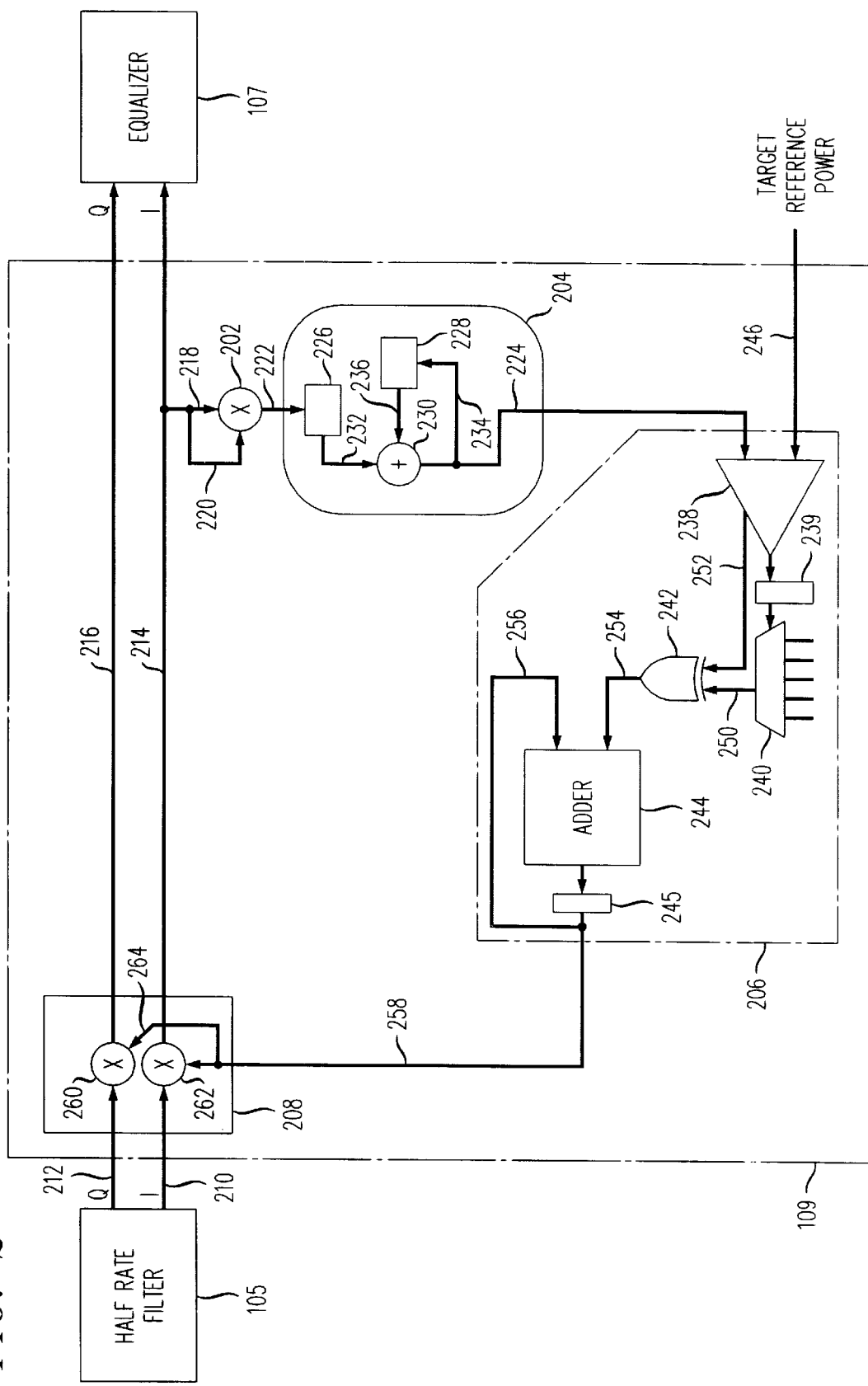
FIG. 2 is a simplified block diagram showing details of the exemplary embodiment of the automatic gain control circuit of FIG. 1.

As shown in more detail in FIG. 2, automatic gain control circuit 109 includes a squarer 202, a low pass filter 204, a gain updating unit 206, and a scalar 208. Operationally, half rate filter 105 outputs multibit digital representations of in-phase and quadrature components respectively on lines 210 and 212. These components are adjusted by scalar 208, according to the invention, and output to equalizer 107 on lines 214 and 216. Squarer 202 is coupled to at least one of lines 214 and 216. In the example of FIG. 2, squarer 202 is coupled to line 214 via lines 218 and 220. In this way, squarer 202 receives the in-phase components, after their adjustment by scalar 208, and performs a squaring operation to obtain a power value in order to initiate a feedback adjustment process to adjust the scaling of subsequent components by scalar 208.

Specifically, squarer 202 squares the in-phase components and outputs squares thereof on line 222. Lowpass filter 204 receives the squares on line 222 and outputs an average input power signal on line 224. Lowpass filter 204 includes a first downscaler 226, a second downscaler 228 and a summer 230. Operationally, first downscaler 226 receives a present square in a series of squares on line 222 and outputs a present scaled value on line 232. The present scaled value is the present square scaled by a first scaling factor of first downscaler 226. Second downscaler 228 receives a previous average input power signal on line 234 and provides a scaled previous average input power signal on line 236. The scaled previous average input power signal is the previous average input power signal scaled by a second scaling factor of second downscaler 228. Summer 230 receives the present scaled value and the scaled previous average input power signal and produces the average input power signal as a sum of the present scaled value and the scaled previous average input power signal. The average input power signal is supplied on line 224 to gain updating unit 206.

Preferably, the value of the first scaling factor of first downscaler 226 is smaller than the value of the second scaling factor of second downscaler 228. Further, it is preferable that the sum of the first scaling factor and the second scaling factor equals one. Thus, for example, the first scaling factor can be a value of approximately 0.1 and the second scaling factor can be a value of approximately 0.9. According to this example, the average input power signal output on line 224 is computed based on the following equation.

$$P_n = \alpha P_{n-1} + (1-\alpha)\Delta P$$

wherein $\Delta P$ represents the square on line 222, $\alpha$ equals the second scaling factor, $1-\alpha$ equals the first scaling factor and $P_{n-1}$ equals the previous value of the average input power signal output from lowpass filter 204 on line 224 and fed back to second downscaler 228 on line 234.

Gain updating unit 206 includes a comparator 238, a range searcher 239, a multiplexer 240, a +/− selector 242, an adder 244 and a gain register 245. Comparator 238 receives the target reference power signal on line 246 and compares the target reference power signal to the average input power signal received on line 224. Comparator 238 produces an error signal which is provided to range searcher 239. Range searcher 239 determines a range corresponding to the magnitude of the error signal, and provides a control signal to a controlling input of multiplexer 240. Multiplexer 240 selects one of a plurality of adjustment values based on the control signal, and outputs the selected adjustment value on line 250. Selector 242 adjusts the sign of the adjustment value based on a sign bit received from comparator 238 on line 252. Selector 242 is configured, for example, as an exclusive-OR gate receiving the adjustment value from line 250 at one input, and receiving a sign bit from line 252 at another input.

Operationally, if the target reference power signal is greater than the average input power signal (indicating that the average input power is too low), then comparator 238 will produce a positive error value, the magnitude of which is provided to range searcher 239, and the sign of which is provided to selector 242 in the form of a logic 0. In this case, selector 242 performs an exclusive-OR operation between the adjustment value provided by multiplexer 240 on line 250 and the logic 0 value provided on line 252, thereby having no effect on the adjustment value. The adder 244 then adds the adjustment value to a previous gain value stored in gain register 245, and stores the new gain value in gain register 245.

Alternatively, if the target reference power signal is less than the average input power signal (indicating that the average input power is too high), then comparator 238 will produce a negative error value, the magnitude of which is provided to range searcher 239 and the sign of which is provided to selector 242 in the form of a logic 1. In this case, selector 242 performs an exclusive-OR operation between the adjustment value provided by multiplexer 240 on line 250 and the logic 1 value provided on line 252, thereby producing a complement of the adjustment value, and causing the adjustment value to be subtracted from a previous gain value by adder 244.

According to the invention, the plurality of adjustment values applied to multiplexer 240 are such that the magnitude of the adjustment value selected by multiplexer 240 is greater when the error value input to multiplexer 240 is greater, and the magnitude of the adjustment value selected by multiplexer 240 is smaller when the error value input to multiplexer 240 is smaller. Further, the adjustment values are preferably distributed such that the difference between magnitudes of two neighboring adjustment values is great for adjustment values corresponding to larger error values. Thus, when error values are large, aggressive adjustment will take place, and when error values are small, unaggressive adjustment will take place.

In one embodiment, five potential adjustment values are selectable by multiplexer 240. The potential adjustment values are multiples of a variable $\Delta$. For example, the potential adjustment values are $\Delta$, $2\Delta$, $4\Delta$, $8\Delta$ and $16\Delta$. The value of $\Delta$ can range from 1 to 16. Thus, in this example, the adjustment value can range from 1 (when $\Delta=1$ and the first adjustment value is selected) to 256 (when $\Delta=16$ and $16\Delta$ is selected by multiplexer 240). According to the invention, the magnitude of $\Delta$ is variable, and is preferably large at signal acquisition, and small at convergence. In one exemplary embodiment, $\Delta$ is permanently fixed at 1 upon convergence, thereby guaranteeing only fine adjustments, such as least significant bit accumulation, to the gain value thereafter.

Adder 244 receives the adjustment value, or its complement, from selector 242 on line 254. Adder 244 also receives a previous gain value on line 256 from gain register 245. Adder 244 adds the adjustment value, or its complement, to the previous gain value to produce a new gain value which is provided to gain register 245. Gain register 245 also supplies the gain value stored therein to scalar 208 on line 258. The gain value is used by scalar 208 to scale the input signal comprising the in-phase and quadrature components on lines 210 and 212 to produce scaled components on lines 214 and 216.

Scalar 208 includes two multipliers 260 and 262. Multiplier 260 receives the quadrature components on line 212 and the gain value on line 264. Multiplier 260 multiplies the quadrature components by the gain value to provide scaled quadrature components via line 216 to equalizer 107. Similarly, multiplier 262 receives the in-phase components on line 210 and the gain value on line 258, and multiplies the in-phase components by the gain value to provide scaled in-phase components via line 214 to equalizer 107.

An exemplary embodiment of a digital automatic gain control circuit has been provided. Variations to the described embodiment should be readily apparent to one of skill in the art. For example, the described embodiment adjusts the gain scaling of the in-phase and quadrature components based on the power of the in-phase component. Alternatively, the adjustment could be based on the amplitude of the in-phase component, thereby eliminating squarer 202 from the circuit and adapting comparator 238 to compare the value received from filter 204 on line 224 with a target reference amplitude received on line 246. Further, although the described embodiment bases the adjustment on the amplitude or power of the in-phase component, it is equally acceptable to adjust the gain based on the quadrature component, or on a function of both the in-phase component and the quadrature component.

Scalar 208 is described as employing two multipliers, 260 and 262, respectively, for the quadrature and in-phase components. Instead, scalar 208 can employ a single multiplier that is multiplexed to be shared by both the in-phase and quadrature components. Scalar 208 can also employ a shifter to perform power-of-two adjustments through shifting. For example, gain updating unit 206 can be modified to provide only power-of-two multiples as gain signals to scalar 208. In this simplified version, scalar 208 can have no multipliers, and instead be based exclusively on one or more shifters. Scalar 208 then can perform gain adjusting by shifting the multibit values received on lines 210 and 212 to the left (multiply by 2, 4, 8, etc.), shifting the values to the right (multiply by ½, ¼, etc.) or not shifting the values (multiply by 1).

The invention claimed is:

1. In a receiver, a digital automatic gain control circuit adapted to receive a series of digital samples representing at least one of an in-phase component and a quadrature component of a received signal, and to provide scaled in-phase components and scaled quadrature components to an equalizer, comprising:

a squarer adapted to receive a digital representation of the at least one of the in-phase component and quadrature component, the squarer being adapted to output a power signal as a square of the digital representation;

a low pass filter adapted to receive the power signal and output an average input power signal based on the received power signal and previously received power signals;

a gain updating unit adapted to receive the average input power signal, to receive a target reference value, and to update a gain value based on a difference therebetween; and a scalar adapted to scale an amplitude of the received signal based on the updated gain value.

2. A digital automatic gain control circuit as recited in claim 1, wherein the low pass filter comprises:

a first downscaler adapted to receive a present sample representing a power level and scaling the present sample by a first scaling factor;

a second downscaler adapted to receive a previous average input power signal and scale the previous average input power signal; and a summer adapted to receive the present scaled value and the scaled previous average input power signal and output a present average input power signal.

3. A digital automatic gain control circuit as recited in claim 2, wherein the first scaling factor is smaller than the second scaling factor.

4. A digital automatic gain control circuit as recited in claim 2, wherein the first scaling factor is about 0.1 and the second scaling factor is about 0.9.

5. A digital automatic gain control circuit as recited in claim 1, wherein the gain updating unit comprises:

a comparator adapted to receive the value representing the at least one of the in-phase component and the quadrature component, to receive the target value, and to output an error signal representing a difference therebetween;

a multiplexer adapted to output one of a plurality of adjustment values based on the error signal;

a selector adapted to receive the adjustment value from the multiplexer and to output one of the adjustment value and a complement of the adjustment value based on a sign bit of the error signal received from the comparator; and an adder adapted to receive the one of the adjustment value and the complement of the adjustment value, and to sum the received value with a previous gain value to produce the updated gain value.

6. A digital automatic gain control circuit as recited in claim 1, wherein the scalar is adapted to shift the digital representations of the in-phase components and the quadrature components based on the updated gain value.

7. A digital automatic gain control circuit as recited in claim 1, wherein the scalar comprises:

a first multiplier adapted to receive a digital representation of an in-phase component and the updated gain value, and adapted to shift the digital representation of the in-phase component by multiplying the digital representation of the in-phase components by the gain value; and a second multiplier adapted to receive a digital representation of the quadrature component and the updated gain value, and adapted to shift the digital representation of the quadrature components by multiplying the digital representation of the quadrature component by the gain value.

8. A method of controlling a gain of a stream of quadrature amplitude modulated digital values, comprising the steps of:

determining an average input power over a series of the digital values;

comparing the average input power to a reference power to create a difference value;

updating a gain value based on the difference value; and using the updated gain value to scale an amplitude of the stream of digital values.

9. A method as recited in claim 8, wherein the step of determining an average input power comprises the steps of:

squaring the digital values; and low pass filtering the squared values.

10. A method as recited in claim 8, wherein the step of using the updated gain value to scale the stream of digital values comprises the step of shifting at least one of the digital values based on the updated gain value.

11. A method as recited in claim 8, wherein the step of using the updated gain value to scale the stream of digital values comprises multiplying the at least one digital value by the updated gain value.

12. A method as recited in claim 8, wherein the step of updating the gain is one of an aggressive updating step and an unaggressive updating step, the aggressive updating step occurring at times near initial signal acquisition, the unaggressive updating step occurring at times distant from signal acquisition.

13. A method as recited in claim 12, wherein the unaggressive step comprises least significant bit accumulation.

14. In an integrated circuit based receiver, an integrated circuit based digital automatic gain control circuit adapted to receive a series of digital samples representing at least one of an in-phase component and a quadrature component of a received signal, and to provide scaled in-phase components and scaled quadrature components to an equalizer, comprising:

a squarer adapted to receive a digital representation of the at least one of the in-phase component and quadrature component, the squarer being adapted to output a power signal as a square of the digital representation;

a low pass filter adapted to receive the power signal and output an average input power signal based on the received power signal and previously received power signals;

a gain updating unit adapted to receive the average input power signal, to receive a target reference value, and to update a gain value based on a difference therebetween; and a scalar adapted to scale an amplitude of the received signal based on the updated gain value.

15. An integrated circuit based digital automatic gain control circuit as recited in claim 14, wherein the scalar is adapted to shift the digital representations of the in-phase components and the quadrature components based on the updated gain value.

16. An integrated circuit based digital automatic gain control circuit as recited in claim 14, wherein the gain updating unit comprises:

a comparator adapted to receive the value representing the at least one of the in-phase component and the quadrature component, to receive the target value, and to output an error signal representing a difference therebetween;

a multiplexer adapted to output one of a plurality of adjustment values based on the error signal;

a selector adapted to receive the adjustment value from the multiplexer and to output one of the adjustment value and a complement of the adjustment value based on a sign bit of the error signal received from the comparator; and an adder adapted to receive the one of the adjustment value and the complement of the adjustment value, and to sum the received value with a previous gain value to produce the updated gain value.

17. An integrated circuit based digital automatic gain control circuit as recited in claim 14, wherein the scalar comprises:

a first multiplier adapted to receive a digital representation of an in-phase component and the updated gain value, and adapted to shift the digital representation of the in-phase component by multiplying the digital representation of the in-phase components by the gain value; and a second multiplier adapted to receive a digital representation of the quadrature component and the updated gain value, and adapted to shift the digital representation of the quadrature components by multiplying the digital representation of the quadrature component by the gain value.

* * * * *